Dec. 7, 1954    M. D. WOODRUFF    2,696,327
WIRE FEEDER
Filed July 16, 1949
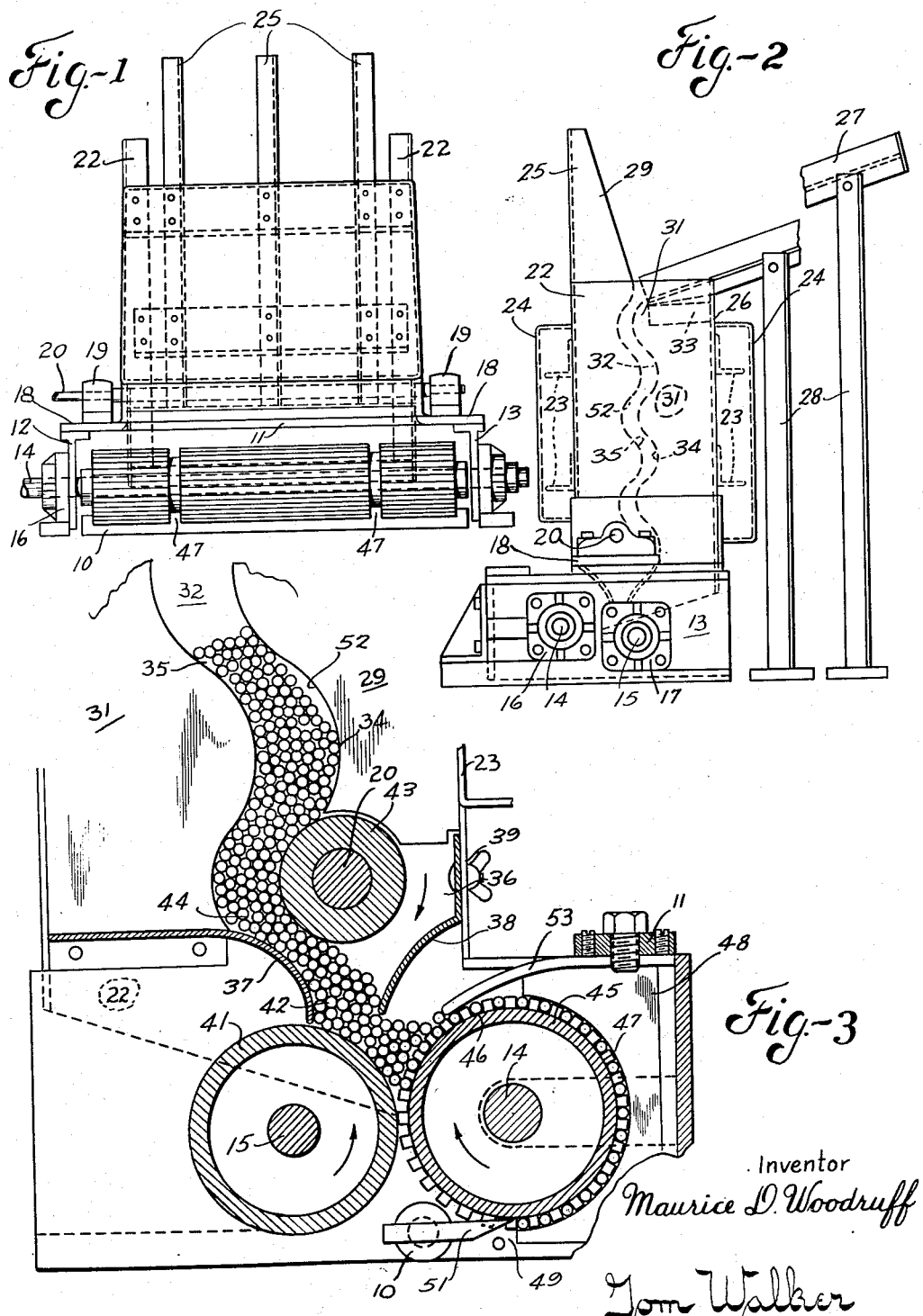
Inventor
Maurice D. Woodruff
Tom Walker
Attorney

United States Patent Office 2,696,327
Patented Dec. 7, 1954

2,696,327

WIRE FEEDER

Maurice D. Woodruff, Springfield, Ohio, assignor to The Bauer Bros. Company, Springfield, Ohio, a corporation of Ohio Application July 16, 1949, Serial No. 105,229

3 Claims. (Cl. 221—201)

This invention relates to material feeding mechanisms, and more particularly to a device for the seriatim feeding of loose wires, rods, tubes and the like.

In manufacturing operations, a need frequently arises for the timed delivery of single wires, rods or the like from a bulk supply, the feeding to take place automatically and without interruption as a part of some assembly process. As an example, there has been put in practice a method of making refrigerator trays by which welding of the cross wires to the underlying connecting rods is carried out while the wires and rods move on a continuously traveling conveyor or the like past a welding station. To carry out such method, it is necessary that single wires be dropped upon the conveyor in predetermined spaced apart relation. To insure mechanical accuracy, as well as for reasons of economy, it is desirable that the feeding of wires to the conveyor be done by an automatic continuously acting machine.

The design of such a machine poses distinct problems, however, due in large part to the inherent difficulties in handling loose wires, or, more particularly, the difficulty in selecting and delivering single wires from a bulk supply. It is to be noted that, in the operation under consideration, not only must the wires be delivered in exact parallelism to one another, but that intermittent or even occasional failure of the feeding machine to select and deliver a single wire cannot be tolerated.

Feeding machines heretofore proposed for functions such as the one described have been unsatisfactory because of a susceptibility to jamming of the wires within the machine or because of occasional misfeeds, or both.

The instant invention proposes a generally new method of and apparatus for feeding loose wires and the like, and its principal object is to obviate the difficulties heretofore encountered in such feeding operation.

Thus the object of the invention is to simplify the construction as well as the means and mode of operation of a feeding device as disclosed herein, whereby such device may not only be economically manufactured, but will be more efficient and accurate in use, adaptable to a wide variety of work, having relatively few parts and be unlikely to get out of repair.

Another object of the invention is to utilize a continuous, as contrasted to intermittent, mode of operation, whereby the machine may be more readily adaptable to operations like that described wherein wires must be dropped in certain spaced relationship upon a traveling conveyor. A feature of the invention in this connection is the provision of a rotary feed roll which continuously selects and carries wires to the discharge station, the roll being constructed and arranged to carry multiple wires successively past the discharge station.

A further object of the invention is to restrict the supply of wires to the feed roll without, however, inducing jamming in the supply route to the feed roll. A feature of the invention in this regard is the provision of a supplemental roll or rolls which operate in the supply route with a restrictive effect but in a manner to agitate the wires and inhibit jamming.

Still another object of the invention is to carry out a process of self-alignment of the wires as they flow to the feed roll as a further precaution against jamming and to assist the feed roll in selecting single wires. It is here a feature of the invention to provide a chute in the supply route of the wires through which the wires descend by gravity and which defines a serpentine passage made up of communicating alternating restrictive and expansive areas. Thus, the wires may continuously change position relatively to one another, and, as they descend through a restrictive area to an expansive area may adjust themselves laterally to a condition of parallelism with the other wires.

A further object of the invention is to provide a device possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a rear view of a feeding apparatus in accordance with the instant invention;

Fig. 2 is a side view of the feeding apparatus; and

Fig. 3 is a fragmentary longitudinal section through the lower end of the apparatus, this view being on an enlarged scale and viewed from the side opposite to that shown in Fig. 2.

Like parts are indicated by similar characters throughout the several views.

Referring to the drawings, a wire feeding machine in accordance with the instant invention may comprise a base unit made up of a lower bar 10 and an upper bar 11, interconnected at their opposite ends by end plates 12 and 13. The end plates 12 and 13 support therebetween, in side-by-side relation, a pair of rotatable shafts 14 and 15, the ends of the shafts being mounted in respective bearing plates 16 and 17 secured to the plates 12 and 13 on the external surface thereof. The shaft 14 extends beyond the plate 12 and is constructed and arranged for a driven connection with an electric motor or like source of power whereby the shaft 14 may be operated in a rotary direction, the direction of rotation of the shaft being clockwise, as viewed in Fig. 3.

Mounted upon the tops of end plates 12 and 13 are opposed angle members 18 upon which are mounted bearing blocks 19 which support a third rotatable shaft 20. In any conventional manner, as by V belts or chain and sprocket mechanisms, the shaft 14 is operatively connected to the shaft 20 and to the shaft 15 so that all three shafts are positively driven in unison with one another when the motor is operating. Further, the connections to the shaft 20 and to the shaft 15 are effected in such way that the shaft 20 has a clockwise direction of movement and the shaft 15 has a counterclockwise direction of movement, as viewed in Fig. 3.

Secured to the opposed angle members 18 and extending upwardly therefrom are a pair of housing elements 22. Extending transversely between and interconnecting the housing elements 22, and at the front and rear of such elements, are spaced apart angle brackets 23 enclosed by front and rear housing elements 24. The brackets 23 are secured to the end elements 22 and further have secured thereto, at spaced points between the end elements, a first set of vertical standards 25 and a second set of vertical standards 26, the former being to the rear of the machine, as viewed in Fig. 2, and the latter to the front of the machine. The standards 25 rise to a greater height than the standards 26 and face an inclined tray 27 mounted at the front of the machine upon elongated feet 28.

Each of the standards 25 has a turned-over flange 29 facing a corresponding standard 26, and each standard 26 has a turned-over flange 31 facing a corresponding standard 25. The standards 25 and 26 are aligned with one another, and the flanges 29 and 31 thereof are in registry with their edges adjacent to one another. Such edges are cut in the form of an undulating curve, the edges of respective flanges 29 and 31 complementing one another to define a vertical serpentine passage or chute 32.

The inner or lower end of the tray 27 enters between the end housing elements 22 and rests upon a table 33 supported between such elements in such position that wires supported upon the tray 27 may enter the upper end of the serpentine passage 32. With regard to this passage, or chute, it is to be noted that it presents alternating wide and narrow areas 34 and 35. Thus, at each of the defined curves, the passage 32 is wider than it is in the relatively straight away portions connecting the curves. While this effect may be gained in a number of ways, it is, in the present instance, obtained by forming each pair of standards 25 and 26 from a single sheet of material. A serpentine cut is made vertically through the sheet so that when the two parts are moved apart the intermediate spaces present the wide and narrow portions 34 and 36, as indicated.

The lower end of the serpentine chute 32 terminates in a chamber 36 formed by opposed downwardly curved members 37 and 38 extending into the base unit. The ends of member 37 are secured to the housing elements 22, while member 38 is adjustably secured to a bracket 39 mounted upon the standards 25. The member 37 contacts, or substantially contacts, a knurled roll 41 fixed to the shaft 15, while the member 38 extends toward the roll 41 but terminates short thereof and defines with member 37 a throat 42 constituting an outlet from the serpentine passage 32. The shaft 20 lies within the chamber 36 and has secured thereto a knurled roll 43 which extends partly within the lower end of the serpentine passage 32 and defines with the member 37 a relatively restricted passage 44 to the throat 42.

The shaft 14 has secured thereto a feed roll 45 formed with a series of transverse grooves 46 and one or more (in the present instance two) circumferential grooves 47. The periphery of the feed roll 45 is in contacting, or substantially contacting, relation with the knurled roll 41. Partly surrounding the feed roll 45 and supported by the base unit in closely adjacent relation thereto is a retainer 48. The upper and lower ends of the retainer 48 lie approximately within the vertical plane of the shaft 14. Such trailing end of the retainer 48 defines a discharge station 49 beneath which a conveyor or other means for receiving the fed wires passes or is arranged.

The transverse grooves 46 in the feed roll 45 receive and carry individual wires, and, as the successive grooves reach the discharge station 49, the wires drop out of the grooves. In order that any wires which might be frictionally held in the grooves may be dislodged therefrom, a finger 51 carried by bar 10 is arranged to enter each circumferential groove 47 just beyond the lower end of retainer 48. Accordingly, wires which do not drop from the grooves by gravity are forced therefrom by the fingers 51.

In the operation of the apparatus, a supply or stock of loose wires is arranged on the tray 27 with their axes at right angles to the direction of feeding movement. Sliding from the tray 27 into the chute 32, the wires descend toward the base unit and feed roll 45. Within the chute 32, the wires are compelled to pass through the alternating restrictive and expansive areas 35 and 34 of the chute with the result that a loose unfilled space, such as that indicated at 52, occurs intermittently. Opportunity thereby is given for the wires to adjust themselves to a condition of parallelism, and there is a continuous shifting or movement of the wires relatively to one another. As the wires approach chamber 36, they encounter knurled roll 43 which is turning in a direction opposed to the direction of feeding movement. The action of the roll 43, therefore, is one to induce agitation of the wires, inhibiting packing thereof. Further, a restriction is imposed by the roll to the movement of wires through the passage 44 and into the throat 42 preventing jamming within the throat.

As the wires pass through throat 42, they are discharged upon knurled roll 41 which likewise is turning in a direction opposed to the direction of feeding movement. The effect of this roll is to retard the downward passage of wires from the curved surfaces above it, permitting only a minimum number to accumulate in the space above and between this roll and the feed roll 45. In addition, the roll 41 imparts sufficient agitation to the wires to prevent jamming between it and member 38, which member, being adjustable upward and downward, acts as a gate to vary the number of wires permitted to reach the feed roll 45.

The feed roll 45 is turning in an opposite direction to the movement of the knurled roll 41, and, therefore, also turns in a direction opposed to the direction of feeding movement. The grooves 46 therein select individual wires from those accumulating on the surface of the feed roll and carry them around to the discharge station 49. The retainer 48 holds the wires within the grooves 46 during the travel to station 49, and resists the tendency for additional wires to be carried upon the periphery of the feed roll. To obtain a more positive exclusion of peripherally carried wires, there may be provided upon bar 11, as shown, a dependent curved scraper element 53 extending into overlying relation to the feed roll. It will further be noted in this connection that the throat member 37 serves as a scraper with respect to the knurled roll 41, preventing wires from being carried by this roll in the direction of rotation thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A wire feeding device, including an inclined tray on which loose wires to be fed are placed, said wires being arranged with their axes at right angles to the direction of feeding motion, a serpentine chute entirely below said tray receiving said wires and through which said wires descend by gravity, said chute having alternating wide and narrow portions with respect to the length thereof inhibiting packing of the wires and inducing parallelism thereof, a knurled roll at the discharge end of said chute extending partly within the chute and turning in a direction opposed to the direction of feeding movement restricting discharge of the wires and inhibiting jamming, a second knurled roll and a feed roll both mounted in a substantially horizontal plane and in a substantially contacting relation beneath the discharge end of said chute and turning in a direction opposed to the direction of feeding movement, said second knurled roll restricting the accumulation of wires upon said feed roll, transverse grooves in said feed roll each arranged to receive and carry a wire, a retainer partly surrounding said feed roll and terminating beneath the feed roll, the wires dropping singly from said feed roll as said transverse grooves successively pass beyond the end of said retainer, and a device for dislodging wires from said grooves which do not drop therefrom by force of gravity.

2. Wire feeding apparatus, including an inclined tray on which loose wires to be fed are placed with their axes at right angles to the direction of feeding movement, a serpentine chute entirely below said tray receiving said wires and through which said wires descend by gravity, said chute being formed with alternating wide and narrow portions with respect to the length thereof inducing parallelism in the wires and inhibiting jamming thereof, a power driven knurled roll turning in a direction opposed to the direction of feeding movement and stationed beneath said chute to have the wires discharged thereon, means preventing the wires from being carried by said roll in the direction of rotation thereof, a power driven feed roll mounted in a substantially horizontal plane in relation to said power driven knurled roll and alongside said knurled roll and likewise turning in a direction opposed to the direction of feeding movement, said knurled roll restricting the accumulation of wires upon said feed roll, transverse grooves in said feed roll each arranged to receive and carry a wire, a retainer partly surrounding said feed roll and terminating beneath the feed roll, the wires dropping singly from said feed roll as said transverse grooves successively pass beyond the end of said retainer, and a device for dislodging wires from said grooves which do not drop therefrom by force of gravity.

3. Wire feeding apparatus according to claim 2, characterized by an adjustable gate mounted on said apparatus and extending toward overlying relation to said feed roll, said gate being operable in conjunction with said knurled roll to control the accumulation of wires on said feed roll.

References Cited in the file of this patent

UNITED STATES PATENTS

| Number | Name | Date |
|---|---|---|
| 483,205 | Berst | Sept. 27, 1892 |
| 789,724 | Goffe | May 16, 1905 |
| 904,159 | Stanley | Nov. 17, 1908 |
| 1,332,168 | Dickinson | Feb. 24, 1920 |
| 1,367,061 | Lewis | Feb. 1, 1921 |
| 1,485,099 | Wahl | Feb. 26, 1924 |
| 1,497,576 | Molins | June 10, 1924 |
| 1,586,310 | Johnson | May 25, 1926 |
| 1,594,821 | Dulligan | Aug. 3, 1926 |
| 1,692,275 | Mortus | Nov. 20, 1928 |
| 2,264,105 | White | Nov. 25, 1941 |
| 2,407,638 | Gettig | Sept. 17, 1946 |
| 2,613,861 | Goerlitz | Oct. 14, 1952 |